April 25, 1939.    B. G. CARLSON    2,155,401
RATE CONTROL COURSE CHANGING MEANS FOR AUTOMATIC PILOTS
Filed July 10, 1937    2 Sheets-Sheet 1
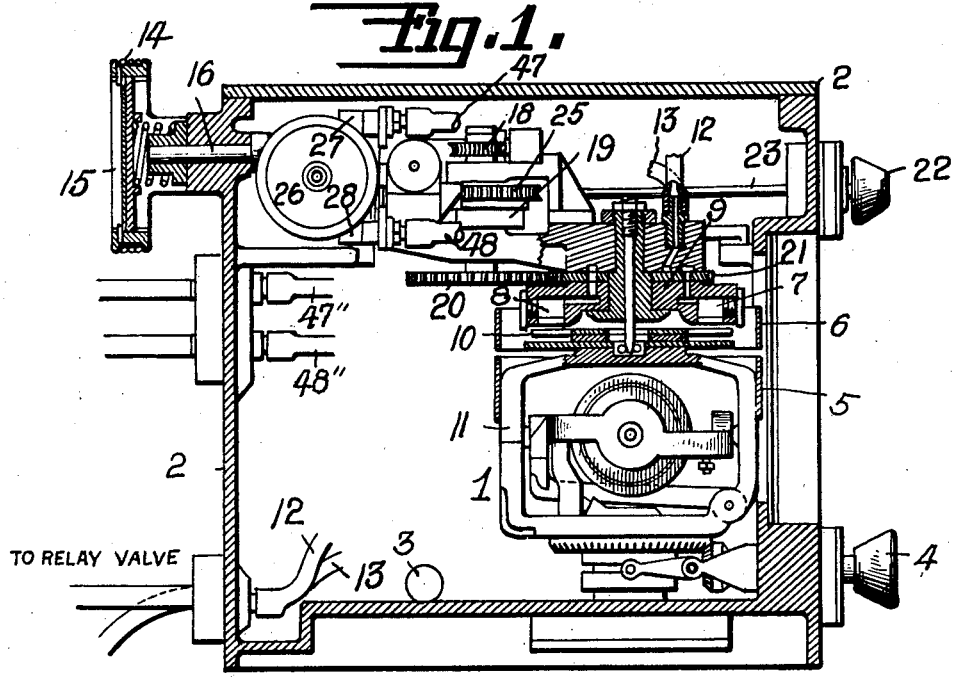
Fig. 1.
Fig. 2.
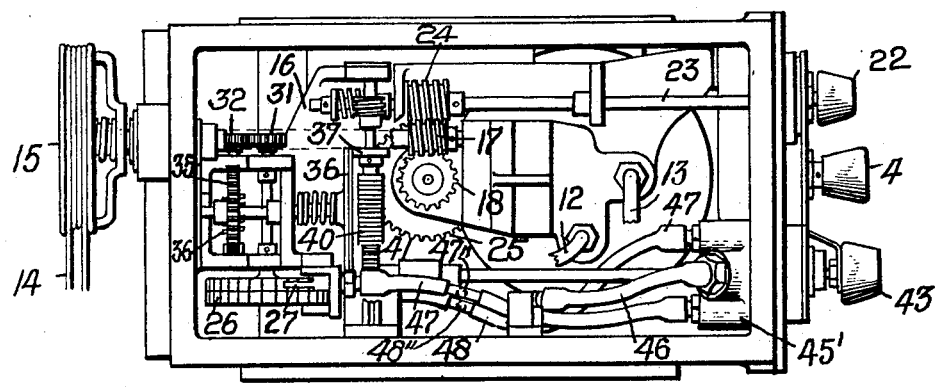
Fig. 3.
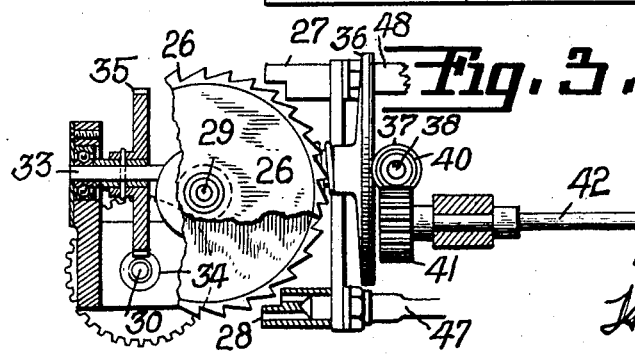
INVENTOR
Bert G. Carlson
BY
Herbert H. Thompson
HIS ATTORNEY April 25, 1939.  B. G. CARLSON  2,155,401
RATE CONTROL COURSE CHANGING MEANS FOR AUTOMATIC PILOTS
Filed July 10, 1937  2 Sheets-Sheet 2
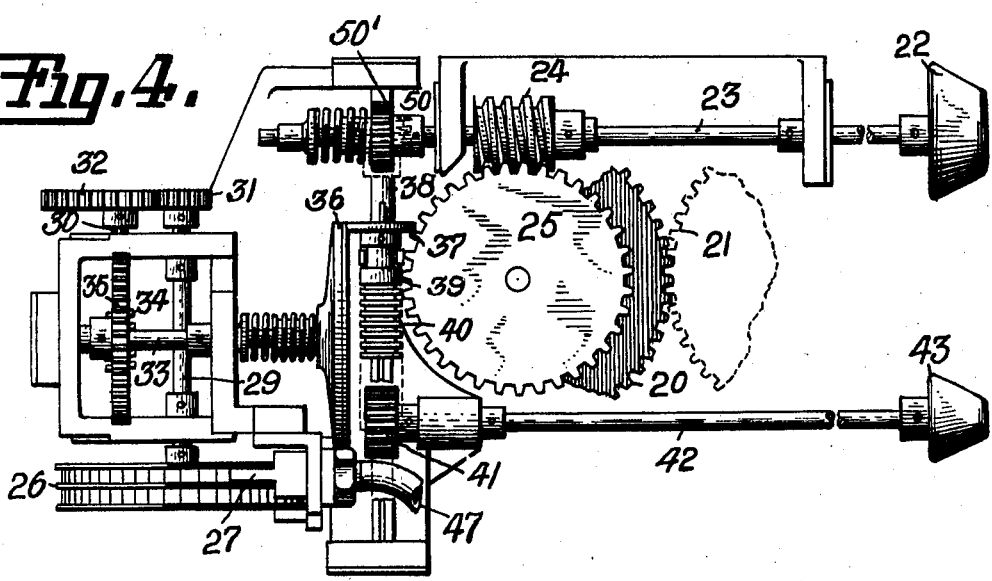
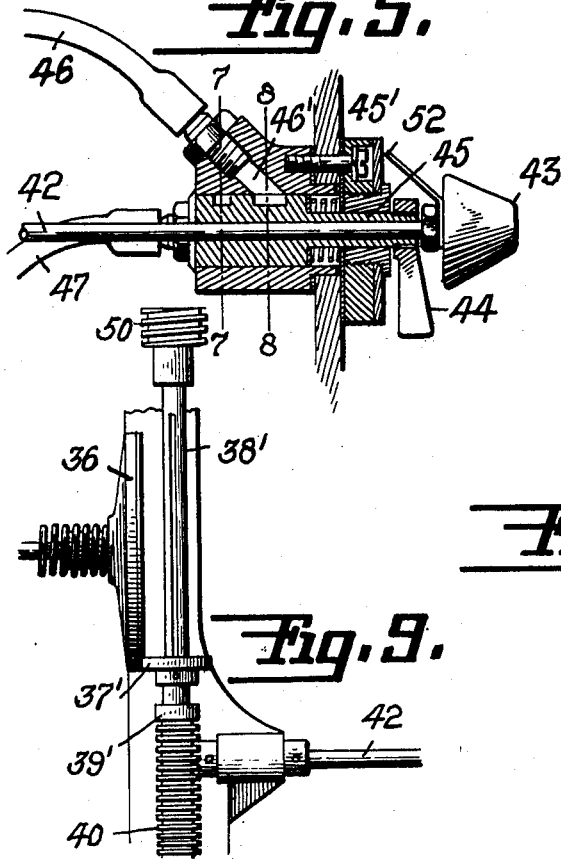
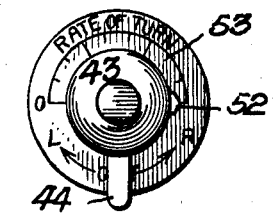
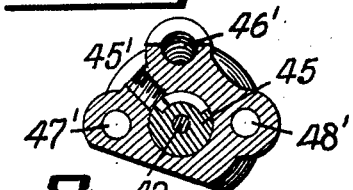
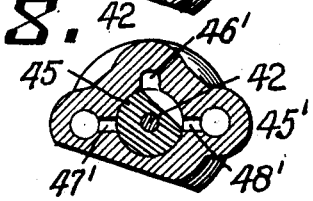
INVENTOR
Bert G. Carlson
BY
Herbert A. Thompson
HIS ATTORNEY.

Patented Apr. 25, 1939

2,155,401

UNITED STATES PATENT OFFICE 2,155,401

RATE CONTROL COURSE CHANGING MEANS FOR AUTOMATIC PILOTS

Bert G. Carlson, Freeport, N. Y., assignor to Sperry Gyroscope Company, Inc., Brooklyn, N. Y., a corporation of New York Application July 10, 1937, Serial No. 152,888

7 Claims. (Cl. 244—76)

This invention relates to automatic pilots especially adapted for aircraft, although the invention also has application to automatic pilots for ships.

In the ordinary automatic pilot, when the aircraft turns, the rate of turn is usually variable with the amount of turn, that is the total turn set in the automatic pilot by the aviator, so that when a large turn is set in the auto-pilot will usually throw the rudder hard-over, causing a high rate of turn with possible discomfort to the passengers. The rate of turn is also, by this method, not directly under the control of the operator, so that simultaneous maneuvers of a squadron of aircraft are difficult.

According to my invention, I have provided means whereby definite and variable rates of turn may be set up at the will of the aviator, so that the rate of turn is independent of the amount of turn desired and is controllable at the will of the aviator. By this means, accurate maneuvers in formation may be performed with military precision and the comfort of the passengers assured.

Referring to the drawings, showing several forms my invention may assume,

Fig. 1 is a vertical section, partly in elevation, of the azimuth steering unit of the automatic pilot with my invention applied thereto.

Fig. 2 is a plan view of the same.

Fig. 3 is a detail, partly in section, on a larger scale, of the variable speed gear.

Fig. 4 is a plan view of the variable speed mechanism.

Fig. 5 is a sectional detail of the setting knob for setting in a turn at a predetermined rate.

Fig. 6 is a face view of the same.

Fig. 7 is a section taken on line 7—7 of Fig. 5.

Fig. 8 is a section taken on line 8—8 of Fig. 5.

Fig. 9 is a view similar to Fig. 4, showing a modified form of variable speed mechanism which is reversible.

The form of azimuth control unit selected to illustrate my invention is similar to that described in my prior Patent No. 2,144,614, dated January 24, 1939, for Aircraft automatic pilots. In this form, the azimuth or directional gyroscope I is enclosed in a casing 2 from which the air is continuously exhausted through pipe coupling 3. The directional gyroscope may be of the conventional form, which is shown as having a resetting knob 4, compass card 5 and follow-up or rudder position card 6. The servomotor for the rudder (not shown) is controlled indirectly, as by means of air pick-off nozzles 7 and 8 on a follow-up rotatable element 9 above the gyroscope, which cooperate with a cut-off plate 10 mounted on the vertical ring 11 of the gyroscope. Pipes 12 and 13 lead from the element 9 to a relay valve (not shown) for controlling the servomotor, as shown in the above mentioned patent.

The follow-up from the rudder is secured by follow-up wire 14 leading from the servomotor rudder to the follow-up pulley 15 at the gyroscope, which drives the shaft 16 having a worm 17 thereon turning a small worm wheel 18 connected through a differential gear in enclosure 19 to gear 20, which drives a gear 21 secured to the mounting 9 of nozzles 7 and 8.

Change of course may be effected in the usual manner by turning knob 22, mounted on a shaft 23 which carries a worm 24 meshing with a worm wheel 25 connected to another arm of the differential 19, thus also driving gear 20.

For setting in a predetermined and variable rate of turn, I have shown a variable speed mechanism which also drives through shaft 23 and worm 24. The interconnection is shown as provided by a pair of intermeshing skew gears 50, 50', the former on shaft 23 and the latter on drive shaft 38. This mechanism is shown as in the form of a small servomotor or source of power, shown in this instance as an air turbine wheel 26 which in Fig. 4 is made reversible, having two parts with oppositely directed blades thereon, one part being driven from the upper air nozzle 27 and the other from the lower air nozzle 28. Said wheel is mounted on a shaft 29, which therefore may be driven in either direction by turning on one or the other of nozzles 27 or 28. Said shaft is shown as driving a second parallel shaft 30 through pinion 31 and gear 32, the shaft 30, in turn, driving a third shaft 33 through a worm 34 and worm wheel 35, thereby effecting a large reduction between the turbine wheels and the shaft 33 on which the driving disc 36 of the variable speed mechanism is mounted. Frictionally engaging said disc is a driven roller 37 slidably splined on said shaft 38. Nozzles 27 and 28 are made double to increase the starting torque.

It will readily be apparent that by varying the position of the roller 37 on disc 36, the rate of rotation of the driven roller may be varied from zero at the center to a maximum at the rim. The radial adjustment of the roller may be accomplished by mounting the roller on a long sleeve 39 having circumferential or circular rack teeth 40 thereon, which are engaged by the teeth of pinion 41 underneath the same, both the shaft 38 and sleeve 39 being broken away in Fig. 4 to show the pinion. Said pinion 41 is shown as mounted on a shaft 42 on which knob 43 is mounted, so that by turning said knob, the roller may be adjusted to any desired position, thereby changing the rate of turn as shown by pointer 52 attached to the knob, as read on scale 53.

In the form here shown, the roller is only movable from the center of the disc in one direction, the reversing being obtained by shutting off one nozzle 27 or 28 and turning on the other. This is shown as effected from a handle 44, preferably mounted adjacent knob 43 and which may be mounted on the sleeve 45 surrounding the shaft 42 (Fig. 5) to form one part of reversing valve 45'. This valve is supplied with air from outside casing 2 through pipe 46 and port 46'. Two pipes 47 and 48 lead therefrom, one from lateral port 47' and the other from lateral port 48', one pipe leading to nozzle 27 and the other pipe to nozzle 28. When the handle is in the position shown in Figs. 5 and 6, both nozzles are shut off, and by moving the handle to the right in Figs. 6 and 8, the ports 46' and 48' are connected, passing air to pipe 48 and to nozzle 27, and when the handle is turned to the left, the other port 47' is connected to energize nozzle 28 to turn the turbine in the opposite direction. Branch pipes 47" and 48" lead without casing 2 so that the turbine may also be controlled from a remote point if desired.

A modified form of variable speed drive is shown in Fig. 9, in which the drive itself is also reversed so that it is unnecessary to employ a reversible servomotor. According to this form, the shaft 38' is extended so that the roller 37' with its connected sleeve 39' may be moved across the entire diameter of the disc 36, thus permitting the roller to be driven in either direction at the variable speed desired. This also permits the valve 35 to be simplified into a simple shut-off valve and the servo mechanism may be otherwise entirely controlled from the rate of turn knob 43.

From the foregoing, the operation of my invention will be readily apparent. In the main form of the invention, when the aviator desires to turn right at a given rate, he first moves the thumb piece 44 from "Off" to "R" (Fig. 6). He then turns the knob 43 until the pointer 52 reads the desired rate of turn on scale 53. The airplane will then continue to turn at that rate until the handle 44 is moved to "Off" or until the knob 43 is turned back to zero, which is done when the desired course change has been effected. For a left turn, handle 44 is of course moved to the left. A turn of a predetermined amount may still be set in through knob 22, as in the prior types of gyropilots.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. In an automatic pilot for dirigible craft having a rudder, the combination with course maintaining means, of a rudder servomotor, a controller at said means for controlling the rudder, a second servomotor for turning said controller to cause turning of the craft, a variable speed device between said last mentioned motor and said controller, and means for setting the desired rate of turn into said device.

2. In an automatic pilot for dirigible craft having a rudder, the combination with course maintaining means, of a rudder servomotor, a controller at said means for controlling the rudder, an air turbine for turning said controller to cause turning of the craft, a variable speed device between said last mentioned motor and said controller, and means for setting the desired rate of turn into said device in either direction desired.

3. In an automatic pilot for dirigible craft having a rudder, the combination with course maintaining means, of a rudder servomotor, a controller at said means for controlling the rudder, settable means for turning said controller through a predetermined angle to cause a turn of a predetermined amount, and additional means for causing a continuous turn at a predetermined rate, said additional means including an air turbine, a disc driven thereby, a roller frictionally engaging the surface of said disc, and manual means for radially adjusting said roller on said disc to vary the speed.

4. In an automatic pilot for dirigible craft having a rudder, the combination with course maintaining means, of a rudder servomotor, a controller at said means for controlling the rudder, settable means for turning said controller through a predetermined angle to cause a turn of a predetermined amount, a servomotor for turning said controller to cause turning of the craft, a variable speed device between said last mentioned motor and said controller, and means for setting the desired rate of turn into said device.

5. In an automatic pilot for dirigible craft having a rudder, the combination with course maintaining means, of a rudder servomotor, a controller at said means for controlling the rudder, a second servomotor for turning said controller to cause turning of the craft, reversing means for driving said motor in either direction, a variable speed device between said last mentioned motor and said controller including a disc driven at a constant speed, a radially adjustable friction roller contacting therewith, and means for setting the desired rate of turn into said device by adjusting the radial position of said roller on said disc.

6. In an automatic pilot for dirigible craft having a rudder, the combination with course maintaining means, of a rudder servomotor, a controller at said means for controlling the rudder, an air turbine for turning said controller to cause turning of the craft, means for driving said turbine in either direction desired, a disc driven by said turbine, a roller frictionally engaging the face thereof, and means for varying at will the radial position of said roller on said disc, whereby the desired rate of turn in the direction desired is set up.

7. In an automatic pilot for dirigible craft having a rudder, the combination with course maintaining means, of a rudder servomotor, a controller at said means for controlling the rudder, an air turbine for turning said controller to cause turning of the craft, a two-way valve having a handle for driving said turbine in either direction desired, a disc driven by said turbine, a roller frictionally engaging the face thereof, and means for varying at will the radial position of said roller on said disc, said last named means including a knob concentrically mounted with said handle and speed graduations adjacent thereto, whereby the desired rate of turn in the direction desired is set up.

BERT G. CARLSON.